(12) United States Patent
Roberts

(10) Patent No.: US 9,346,357 B2
(45) Date of Patent: May 24, 2016

(54) AIR SUSPENSION PRESSURE DISPLAY

(71) Applicant: Questar Ventures Inc., Prince George (CA)

(72) Inventor: Byron Roberts, Prince George (CA)

(73) Assignee: Questar Ventures Inc., Prince George (CA)

( * ) Notice: Subject to any disclaimer, the term of this patent is extended or adjusted under 35 U.S.C. 154(b) by 6 days.

(21) Appl. No.: 14/447,398

(22) Filed: Jul. 30, 2014

(65) Prior Publication Data
US 2015/0035664 A1 Feb. 5, 2015

Related U.S. Application Data

(60) Provisional application No. 61/945,728, filed on Feb. 27, 2014, provisional application No. 61/859,863, filed on Jul. 30, 2013.

(51) Int. Cl.
*B60Q 1/00* (2006.01)
*B60K 35/00* (2006.01)

(52) U.S. Cl.
CPC ............ *B60K 35/00* (2013.01); *B60G 2202/152* (2013.01); *B60G 2400/51222* (2013.01); *B60G 2600/042* (2013.01)

(58) Field of Classification Search
CPC ............... B60G 11/27; B60G 17/0155; B60G 2600/20; B60G 2500/302; B60G 2500/30; B60G 2800/914; B60G 2206/0116; B60G 2400/51222; B60G 2800/7022; B60G 2202/152; B60G 2600/1875; B60G 2600/11; B60G 2600/042; B60K 35/00
USPC ......... 340/438, 439, 442–449, 440; 73/146.5; 701/29, 36, 37, 38, 40; 280/5.512, 280/5.507, 5.514, 5.515
See application file for complete search history.

(56) References Cited

U.S. PATENT DOCUMENTS

| | | | | |
|---|---|---|---|---|
| 5,109,213 A | * | 4/1992 | Williams | ............... B60C 23/007 200/61.22 |
| 6,507,276 B1 | * | 1/2003 | Young | ................. B60C 23/0464 340/442 |
| 2013/0081883 A1 | * | 4/2013 | Yang | ...................... G01G 19/10 177/1 |
| 2014/0107892 A1 | * | 4/2014 | Coombs | ................. B60G 11/27 701/40 |

* cited by examiner

*Primary Examiner* — Anh V La
(74) *Attorney, Agent, or Firm* — Smiths IP

(57) ABSTRACT

A system for displaying the relative air pressure in an air suspension system for a vehicle comprises an intake line connecting from the air suspension system to a manifold. One or more pressure switches are connected to the manifold. A corresponding light is attached to each of the pressure switches. When the pressure within the manifold reaches preconfigured levels, one of the pressure switches is closed, and a corresponding light is illuminated. The lights are located on the side of the vehicle such that they can be easily seen.

22 Claims, 4 Drawing Sheets ical ride height is reached (the ride height being the distance between the bottom of the trailer and the center of the axle). For heavier loads, a higher air pressure within the air springs is needed before the ride height is reached. The air within the air springs provides the vehicle with suspension by isolating the vehicle's contents from bumps and vibrations caused by travel on the road.

AIR SUSPENSION PRESSURE DISPLAY

REFERENCES TO RELATED APPLICATIONS

This application claims the benefit of U.S. Provisional Application No. 61/859,863 filed Jul. 30, 2013 and U.S. Provisional Application No. 61/945,728 filed Feb. 27, 2014, the contents of all of which are hereby incorporated by reference.

FIELD OF THE INVENTION

The invention relates to the field of air suspension systems for trucks and trailers, and in particular, to displays for informing operators about the pressure level in air suspension systems.

BACKGROUND OF THE INVENTION

Air suspension systems are used in vehicles to provide a smooth and constant ride. They may be found in all types of vehicles, including in particular, trucks and trailers. An air pump or air compressor pressurizes the air within one or more air bags (or air springs), raising the chassis of the vehicle from the axles. Typically, the air springs are inflated with pressurized air until a certain ride height is reached (the ride height being the distance between the bottom of the trailer and the center of the axle). For heavier loads, a higher air pressure within the air springs is needed before the ride height is reached. The air within the air springs provides the vehicle with suspension by isolating the vehicle's contents from bumps and vibrations caused by travel on the road.

Currently, load operators are able to determine the particular air pressure within the system by reading a pressure gauge. These gauges are typically located in the cabs of the trucks, or the gauges are on sides of the trailers. Therefore, a person loading a trailer would not be able to monitor the air pressure without either periodically going inside the cab or to the side of the trailer or communicating in some manner with a person reading the gauges. This is both time-consuming and prone to error (e.g. if there is an error in communications between the load operator and the person within the cab). In addition, the gauges may be difficult to read, especially at night. All of the above create a safety issue.

Accordingly, a need exists for an improved system for monitoring the air pressure within an air suspension system that overcomes the deficiencies noted above.

SUMMARY OF THE INVENTION

According to the invention, a series of lights provides a simple and easy-to-read display of the relative air pressure within the air springs. In one embodiment, various lights will light up when the air pressure is below, at, or above the appropriate air pressure. The color and number of lights can be varied. The lights may be located conveniently at the side of the trailer so that the load operator can easily see them. Adjustment mechanisms are provided that allow the operator to configure or calibrate the air pressure at which the lights will be illuminated.

A system for displaying relative air pressure within one or more air springs of an air suspension system for vehicle comprises an intake line, a manifold, one or more pressure switches, one or more lights, and a power source. The intake line is operatively connected to the one or more air springs. The manifold is connected to the intake line. The one or more pressure switches is connected to the manifold, and each of the pressure switches is configured to close when a particular air pressure is reached within the manifold. Each of the pressure switches is operatively connected to one of the one or more lights and the one or more lights are visible along a side of the vehicle. The power source is connected to the pressure switches. When one of the pressure switches is closed, a corresponding one of the one or more lights is illuminated.

In another embodiment, the intake line is connected to the one or more air springs through a second line that is connected to the one or more air springs.

In a further embodiment, the intake line is connected to the second line through a T-joint.

In yet another embodiment, the number of pressure switches is three.

In still another embodiment, the power source is a battery.

In another embodiment, the power source is located on the vehicle.

In a further embodiment, the system further comprises a box, where the box houses the manifold, the pressure switches, and the lights.

In yet another embodiment, the system further comprises a second box and one or more secondary lights located on the second box. The second box is located on an opposite side of the vehicle from the lights. Each of the pressure switches is operatively connected to one of the one or more secondary lights. When one of the pressure switches is closed, a corresponding one of the one or more secondary lights is illuminated.

In another embodiment, each of the pressure switches comprises an adjustment mechanism to allow for the adjustment of the particular air pressure when each of the pressure switches closes.

In yet another embodiment, the adjustment mechanism comprises a screw for adjusting the particular air pressure.

In a further embodiment, the one or more lights are of different colors when illuminated. The first one of the one or more lights may be green. The second one of the one or more lights may be red. The third one of the one or more lights may be amber.

In yet another embodiment, where there are three lights, a first one of the three lights is illuminated when the particular air pressure is at a first level that is lower than a correct air pressure for said air suspension system. A second one of the three lights is illuminated when the particular air pressure is at a second level that is approximate to the correct air pressure for the air suspension system. A third one of the three lights is illuminated when the particular air pressure is at a third level that is above to the correct air pressure for the air suspension system.

In another embodiment, a system for displaying relative air pressure within one or more air springs of an air suspensions system for a vehicle comprises an intake line, an adjustment box, and a display box. The intake line is operatively connected to the one or more air springs. The adjustment box comprises a manifold connected to the intake line and one or more pressure switches operatively connected to the manifold, each of the pressure switches configured to close when a particular air pressure is reached within the manifold. The display box comprises one or more lights, where each of the pressure switches is operatively connected to one of the one or more lights and where the one or more lights are visible along a side of the vehicle. When one of the pressure switches is closed, a corresponding one of the one or more lights is illuminated.

In yet another embodiment, the system further comprises a power source connected to the pressure switches. The power source may be a battery or it may be located elsewhere on the vehicle.

In a further embodiment, the intake line is connected to the one or more air springs through a second line that is connected to the one or more air springs. The intake line may be connected to the second line through a T-joint.

In another embodiment, a system for displaying relative air pressure within one or more air springs of an air suspensions system for a vehicle comprises an intake line, a manifold, one or more pressure switches, a light, and a power source. The intake line is operatively connected to the one or more air springs. The manifold is connected to the intake line. The one or more pressure switches is operatively connected to the manifold, and each of the pressure switches configured to close when a particular air pressure is reached within the manifold. Each of the pressure switches is operatively connected to the light, where the light is capable of illuminating at two or more different colors. The power source is connected to the pressure switches. When one of the pressure switches is closed, the light is illuminated at one of the two or more different colors.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein for completeness.

BRIEF DESCRIPTION OF THE DRAWINGS

The preferred embodiment of the invention will be described by reference to the drawings thereof, in which.

DESCRIPTION OF THE PREFERRED EMBODIMENT

Figure 1:
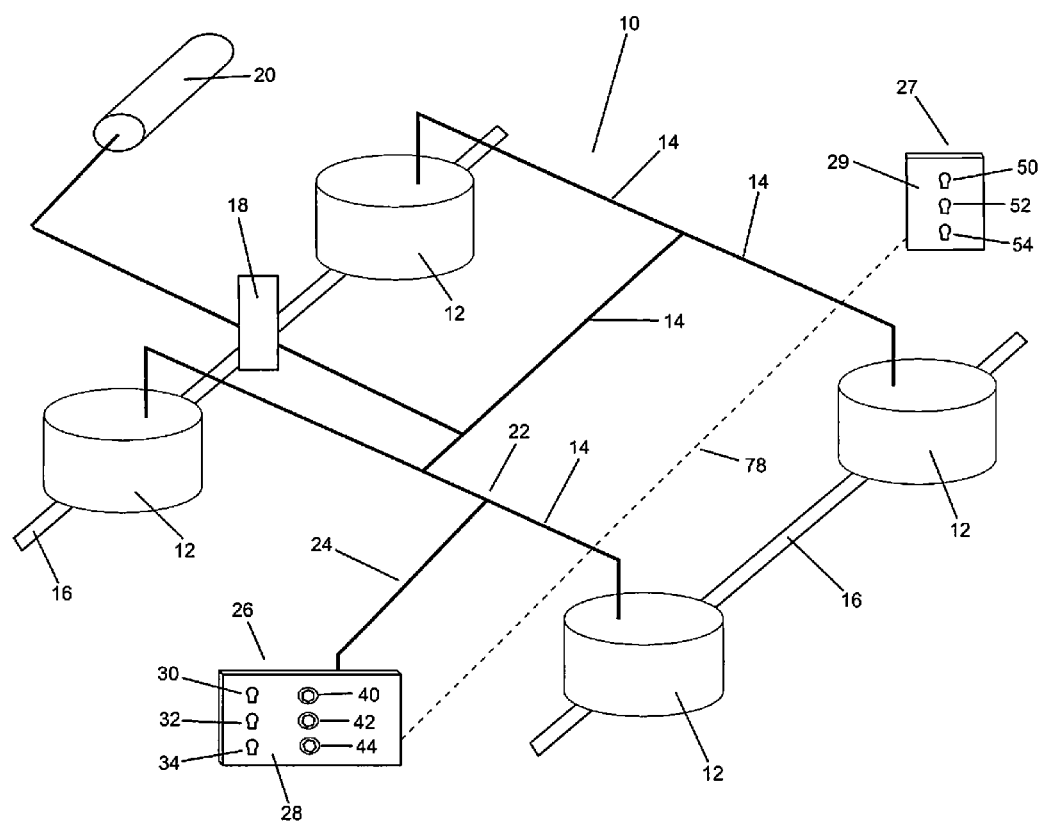
FIG. 1 shows a schematic view of one embodiment of the invention incorporated with an air suspension system.
Figure 2:
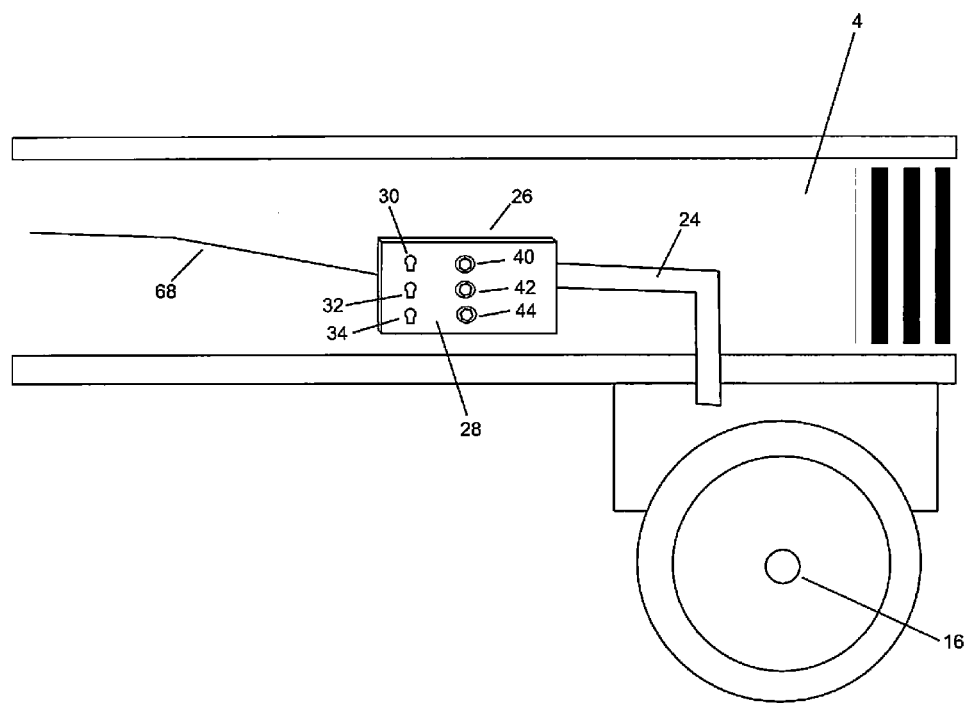
FIG. 2 shows a view of the invention attached to the chassis of a vehicle.

Referring to FIGS. 1 and 2, an air suspension system 10 for a vehicle comprises a plurality of air springs 12. The vehicle may be a trailer, a truck, or another similar device. The air springs 12 support the chassis 4 of the vehicle on the axles 16 and are connected together through air intake lines 14 that feed air into the air springs 12. As air is fed into the air springs 12, the air springs 12 inflate, raising the chassis 4 from the axles 16 (and thereby increasing the ride height). A levelling valve 18 controls the flow of air into the air intake lines 14 from an air compressor 20. For example, the levelling valve 18 allows for air to be fed into the air intake lines 14 until a certain ride height is reached, at which time, the levelling valve 18 prevents further air from being fed into the air intake lines 14. Along one of the air intake lines 14, a T-joint 22 is provided. A secondary air line 24 extends from one arm of the T-joint 22 to a detection unit 26.

As shown in FIG. 2, the detection unit 26 comprises a panel 28. The detection unit 26 is preferably located on the side of the chassis 4 at a location that would allow the panel 28 to be easily visible. Preferably, the detection unit 26 is a box. The box may be enclosed or it may be partially open. One or more lights 30, 32, 34 is provided on the panel 28. In the embodiment shown in FIGS. 1 and 2, the panel 28 comprises three lights 30, 32, 34 arranged vertically; however, a different number of lights (such as two, four, five, etc.) in a variety of orientations is also possible. Any suitable light may be used, such as those manufactured by Truck-Lite Global LLC. The detection unit 26 also comprises one or more pressure switches (or senders) 40, 42, 44. In the embodiment shown in FIGS. 1 and 2, the pressure switches 40, 42, 44 are located on the panel 28; however, they may also be placed on other locations on the detection unit 26. Preferably, the number of pressure switches 40, 42, 44 corresponds to the number of lights 30, 32, 34. Referring to FIG. 1, it is also possible to have a secondary detection unit 27. This secondary detection unit 27 may be placed on another location on the chassis 4 (e.g. on the other side of the chassis 4). The secondary detection unit 27 may comprise a secondary panel 29 with one or more secondary lights 50, 52, 54. Preferably, the number of secondary lights 50, 52, 54 corresponds to the number of lights 30, 32, 34.

Figure 3:
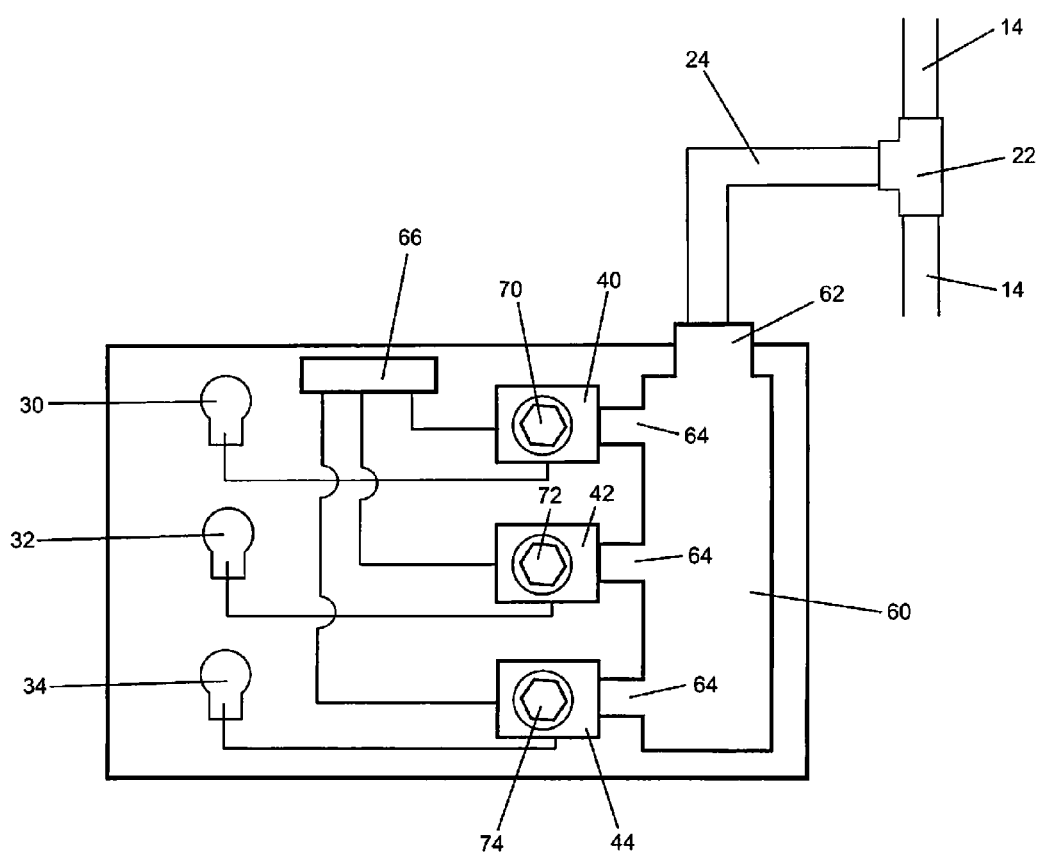
FIG. 3 shows a view of the invention.

Referring to FIG. 3, the secondary air line 24 extends from the T-joint 22 into the detection unit 26 and is attached to an intake 62 of a manifold 60. In the embodiment shown in FIG. 3, the manifold 60 has three outputs 64. Each of the outputs 64 is connected (either directly or through some other connection) to one of the pressure switches 40, 42, 44. In embodiments where the number of pressure switches 40, 42, 44 is increased or decreased, the number of outputs 64 on the manifold 60 is adjusted accordingly. The pressure switches 40, 42, 44 may be of the type that are commercially available, such as those manufactured by Honeywell International Inc.

Each of the pressure switches 40, 42, 44 comprises adjustment mechanisms 70, 72, 74. The pressure switches 40, 42, 44 are switches that close an electrical contact when a certain pressure is reached. The adjustment mechanisms 70, 72, 74 allow for the adjustment of the pressure level at which the switches are closed. The detection unit 26 further may comprise a power source 66, such as a battery. In another embodiment, the detection unit 26 may take electrical power from a source on the vehicle through wire 68 (e.g. from the electrical power used to power the clearance lights on the vehicle), as shown in FIG. 2. Each of the pressure switches 40, 42, 44 is connected to either the power source 66 or wire 68 and to one of the lights 30, 32, 34.

As the manifold 60 is connected to the secondary air line 24 (which is connected to the T-joint 22 and the air intake lines 14) the air pressure within the manifold 60 is the same as the air pressure within the air intake lines 14 and the air springs 12. Each of the pressure switches 40, 42, 44 can be preconfigured to close at different pressures. Therefore, when the pressure within the air springs 12 reaches one of those preconfigured pressures, the appropriate pressure switch 40, 42, 44 is closed, resulting in the corresponding light 30, 32, 34 being illuminated.

In this manner, the lights 30, 32, 34 can provide a relative display of the air pressure within the air springs 12. For example, the detection unit 26 may cause the first light 30 to be illuminated when the air pressure within the air springs 12 reaches a particular level (e.g. 55 psi). This may be used to indicate when the air springs 12 are nearing their appropriate limit (i.e. the vehicle is nearing its correct load). The second light 32 may be illuminated when the air pressure in the air springs 12 reaches a higher level (e.g. 60 psi). This may be used to indicate when the air springs 12 are at their appropriate limit (i.e. the vehicle is at its correct load).

The third light 34 may be illuminated when the air pressure within the air springs 12 reaches a third, still higher, level (e.g. 65 psi). This may be used to indicate when the air springs 12 are over their appropriate limit (i.e. the vehicle is over its correct load). This may be used as an indication to the operator that the vehicle is overloaded and that some of its contents needs to be removed.

The exemplary air pressure levels given above for triggering the illumination of the lights 30, 32, 34 are only meant to be one example of the air pressure levels that may be used. The particular air pressure levels to be used can be adjusted to suit the particular circumstances, which may take into account the particular air springs 12, the size of the vehicle, and the operating and safety regulations of a particular jurisdiction. The adjustment of the pressure levels needed to trigger the illumination of the specific lights 30, 32, 34 can be made using the adjustment mechanisms 70, 72, 74. The adjustment mechanisms 70, 72, 74 allow the operator to adjust the air pressure levels at which the corresponding lights 30, 32, 34 will illuminate. Preferably, the adjustment mechanisms 30, 32, 34 comprise a screw that may be turned (e.g. using a screwdriver or an Allen wrench) to effect the adjustment. In other embodiments, the adjustment mechanisms 30, 32, 34 may also be electronically manipulated.

In another embodiment, the lights 30, 32, 34 may be of different colors when illuminated. For example, the first light 30 may be green when illuminated, the second light 32 may be amber or yellow when illuminated, and the third light 34 may be red when illuminated. These colors correspond to colors that the operator may easily recognize as meaning "safe", "caution", and "danger", respectively. For example, when the first light 30 is illuminated (with the color green), this may indicate to the operator that he or she may continue to load the vehicle. When the second light 32 is illuminated (with the color amber), this may indicate to the operator that he or she should consider stopping any further loading of the vehicle. When the third light 34 is illuminated (with the color red), this may indicate to the operator that he or she should reduce the load of the vehicle. Although the colors green, amber (or yellow), and red have been described, it is to be understood that any combination of colors may also be used.

Referring to FIG. 1, in situations where the secondary unit 27 is present, the secondary lights 50, 52, 54 on the secondary panel 29 should preferably correspond in function to the lights 30, 32, 34. For example, if the secondary unit 27 is located on the other side of the chassis 4 from the detection unit 26, then the operator can view either the panel 28 or the secondary panel 29 easily from either side of the vehicle. The detection unit 26 and the secondary unit 27 should be connected together via connection 78 to allow the secondary lights 50, 52, 54 to function in the same manner as the lights 30, 32, 34. The connection 78 may be wired or wireless (e.g. by Bluetooth communications).

As mentioned above, although the embodiment shown in FIG. 1 shows the panel 28 having three lights 30, 32, 34, it is to be understood that the number of lights may be varied. For example, it is possible to only use two lights. In such an embodiment, the first light may be illuminated when the air pressure reaches a level that is at its appropriate limit, and the second light may be illuminated when the air pressure reaches a level that is above its appropriate limit. Similarly, it is also possible to use more than three lights. In such an embodiment, the additional light may be illuminated when the air pressure is, for example, more than 10 psi lower than the appropriate limit. Preferably, the number of lights should correspond to the number of pressure switches (such that each light is connected to one pressure switch).

In another embodiment, instead of the panel 28 providing three separate lights 30, 32, 34 that display different colors when illuminated, the panel 28 may comprise a single light that is able to display different colors (depending on the air pressure level). For example, the light may illuminate green when a first air pressure level is reached, amber when a second air pressure level is reached, and red when a third air pressure level is reached. These air pressure levels may correspond to the same air pressure levels used when separate lights 30, 32, and 34 are used. In this embodiment, the number of pressure switches needed would correspond to the number of discrete air pressure levels used.

Figure 4:
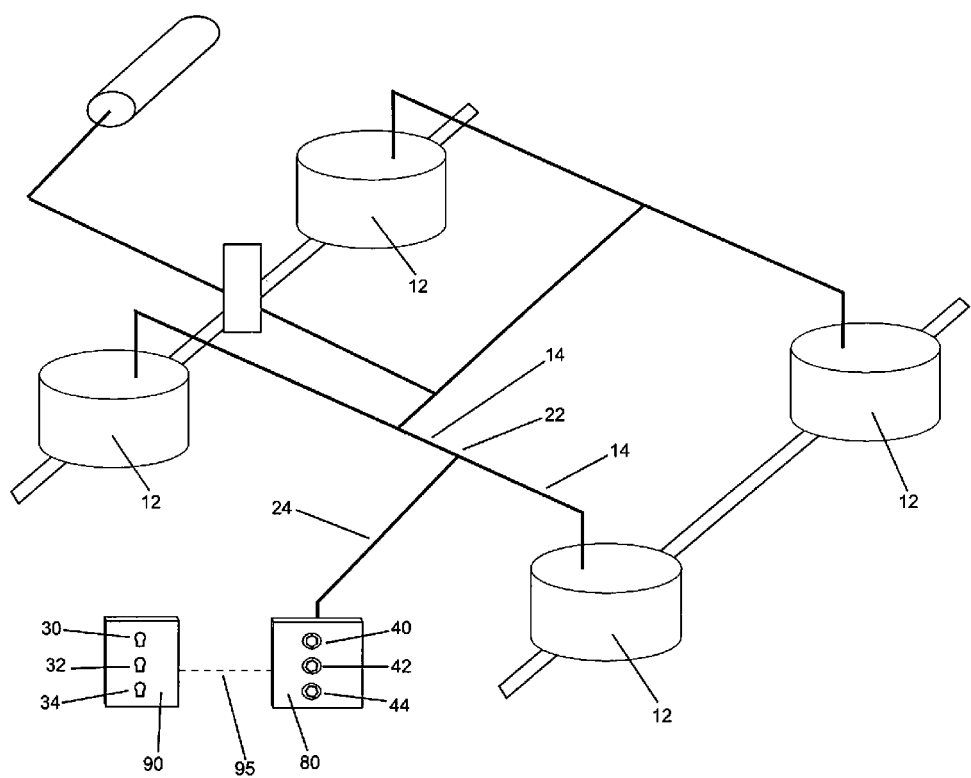
FIG. 4 shows a schematic view of another embodiment of the invention.

FIG. 4 shows a further embodiment. In this embodiment, the secondary air line 24 extends from the T-joint 22 to an adjustment unit 80. The manifold 60 and the pressure switches 40, 42, 44 are located within the adjustment unit 80. A separate display unit 90 is connected to the adjustment unit 80 but located apart from it. The lights 30, 32, 34 are located on the display unit 90. The adjustment unit 80 and the display unit 90 are connected together through a local connection 95. The local connection 95 may be wired or wireless.

In another embodiment, the secondary air line 24 is directly connected to one of the air springs 12, instead of connecting to one of the air intake lines 14 through the T-joint 22.

The invention provides a convenient and easy-to-understand indication of the relative air pressure within the air springs 12. It allows the operator to quickly determine whether the load of the vehicle is within correct (and safe) limits. Also, by providing the detection unit 26 on the side of the chassis 4, the operator is able to see firsthand the relative air pressure within the air springs 12, without having to enter the cab of the vehicle or communicate with someone else within the cab.

It will be appreciated by those skilled in the art that the preferred embodiment has been described in some detail but that certain modifications may be practiced without departing from the principles of the invention.

The invention claimed is:

1. A system for displaying relative air pressure within one or more air springs of an air suspension system for a vehicle during loading of said vehicle, said system comprising:
   an intake line operatively connected to said one or more air springs;
   a manifold connected to said intake line;
   one or more pressure switches connected to said manifold, each of said pressure switches configured to close during loading of said vehicle when a particular air pressure is reached within said manifold;
   one or more lights, wherein each of said pressure switches is operatively connected to one of said one or more lights and wherein said one or more lights are visible during loading of said vehicle along an exterior side of said vehicle; and
   a power source connected to said pressure switches;
   wherein when one of said pressure switches is closed, a corresponding one of said one or more lights is illuminated.

2. The system of claim 1, wherein said intake line is connected to said one or more air springs through a second line that is connected to said one or more air springs.

3. The system of claim 2, wherein said intake line is connected to said second line through a T-joint.

4. The system of claim 1, wherein a number of said pressure switches is three.

5. The system of claim 1, wherein said power source is a battery.

6. The system of claim 1, wherein said power source is located on said vehicle.

7. The system of claim 1 further comprising a box, wherein said box houses said manifold, said pressure switches, and said lights.

8. The system of claim 1 further comprising:
a second box, said second box located on an opposite side of said vehicle from said lights;
one or more secondary lights located on said second box, wherein each of said pressure switches is operatively connected to one of said one or more secondary lights;
wherein when one of said pressure switches is closed, a corresponding one of said one or more secondary lights is illuminated.

9. The system of claim 1, wherein each of said pressure switches comprises an adjustment mechanism to allow for adjustment of said particular air pressure when each of said pressure switches closes.

10. The system of claim 9, wherein said adjustment mechanism comprises a screw for adjusting said particular air pressure.

11. The system of claim 1, wherein said one or more lights are of different colors when illuminated.

12. The system of claim 11, wherein a first one of said one or more lights is green, a second one of said one or more lights is red, and a third one of said one or more lights is amber.

13. The system of claim 4, wherein a first one of said three lights is illuminated when said particular air pressure is at a first level that is lower than a correct air pressure for said air suspension system; a second one of said three lights is illuminated when said particular air pressure is at a second level that is approximate to said correct air pressure for said air suspension system; and a third one of said three lights is illuminated when said particular air pressure is at a third level that is above said correct air pressure for said air suspension system.

14. A system for displaying relative air pressure within one or more air springs of an air suspension system for a vehicle during loading of said vehicle, said system comprising:
an intake line operatively connected to said one or more air springs;
an adjustment box, said adjustment box comprising:
a manifold connected to said intake line; and
one or more pressure switches connected to said manifold, each of said pressure switches configured to close during loading of said vehicle when a particular air pressure is reached within said manifold; and
a display box, said display box comprising:
one or more lights, wherein each of said pressure switches is operatively connected to one of said one or more lights and wherein said one or more lights are visible during loading of said vehicle along an exterior side of said vehicle;
wherein when one of said pressure switches is closed, a corresponding one of said one or more lights is illuminated.

15. The system of claim 14 further comprising a power source connected to said pressure switches.

16. The system of claim 14, wherein said intake line is connected to said one or more air springs through a second line that is connected to said one or more air springs.

17. The system of claim 16, wherein said intake line is connected to said second line through a T-joint.

18. The system of claim 14, wherein a number of said pressure switches is three.

19. The system of claim 14, wherein each of said pressure switches comprises an adjustment mechanism to allow for adjustment of said particular air pressure when each of said pressure switches closes.

20. The system of claim 19, wherein said adjustment mechanism comprises a screw for adjusting said particular air pressure.

21. The system of claim 14, wherein said one or more lights are of different colors when illuminated.

22. A system for displaying relative air pressure within one or more air springs of an air suspension system for a vehicle during loading of said vehicle, said system comprising:
an intake line operatively connected to said one or more air springs;
a manifold connected to said intake line;
one or more pressure switches operatively connected to said manifold, each of said pressure switches configured to close during loading of said vehicle when a particular air pressure is reached within said manifold;
a light, wherein each of said pressure switches is operatively connected to said light and wherein said light is capable of illuminating at two or more different colors during loading of said vehicle along an exterior side of said vehicle; and
a power source connected to said pressure switches;
wherein when one of said pressure switches is closed, said light is illuminated at one of said different colors.

* * * * *